3,072,469
GENERATION OF REDUCING GAS
du Bois Eastman, Whittier, and William L. Slater, La Habra, Calif., assignors to Texaco Inc., New York, N.Y., a corporation of Delaware
No Drawing. Filed June 14, 1960, Ser. No. 35,873
6 Claims. (Cl. 48—215)

This invention relates to the reduction of metal ores with carbon monoxide and hydrogen. In one of its more specific aspects, this invention relates to a process for the production of reducing gas comprising carbon monoxide and hydrogen by direct partial oxidation of heavy liquid hydrocarbons with air to produce a reducing gas stream suitable for the reduction of reducible metal ores, e.g. iron ore.

At the present time a number of processes are commercially feasible for direct reduction of iron ore with hydrogen or with mixtures of hydrogen and carbon monoxide. Some of the most promising of these processes involve the reduction of solid metal oxide to elemental metal without fusion of the metal or the oxide. The partial reduction of ores, e.g. partial reduction of non-magnetic iron ore to magnetic form, is also of commercial importance.

The reduction may be carried out in a vertical shaft type reduction vessel in which the downwardly moving bed of solid is maintained. In a typical continuous moving bed operation, metal oxide is charged to the top of the bed while reduced metal is withdrawn from the bottom. Reducing gas is introduced near the bottom of the bed and passed upwardly through the bed countercurrent to the movement of the solid particles. The reduced ore may be removed in solid sponge form or in liquid form.

Instead of a downwardly moving settled bed of solid particles, and in many cases preferable thereto, a dense phase fluidized bed of particles may be maintained in a reducing zone. For continuous operation with fluid beds, a series of such beds are generally desirable with the movement of solid particles from bed to bed countercurrent to the flow of reducing gases. Reducing gas introduced in the lower portion of the bed is passed upwardly therethrough at a rate sufficient to set the particles in the bed in random motion, but insufficient to entrain more than a minor portion of the particles from the bed.

Some ore reduction processes employ a rotary kiln with ore in particle form passing through the kiln in one direction and reducing gas passing therethrough in the opposite direction.

In current processes, the reduction of iron ore in kilns is carried out at temperatures in the range of about 1100 to 2,000° F. Coke and limestone may be charged to the kiln with the iron ore. The temperature is kept below that at which iron ore and various reduction products sinter and adhere in massive form to the walls of the kiln. It is desirable in some cases that the reducing gas stream entering the kiln have a temperature in the range of 1800 to 2400° F. The product from the rotary kiln may be briquetted as charge for open hearth, electric, or blast furnaces, depending upon the quality of the ore charged to the reducing kiln.

The reduction in the kiln is carried out at atmospheric pressure. Reduction in moving beds or fluidized bed process may be carried out at elevated pressure or at atmospheric pressure. An elevated pressure is desirable in that it increases the capacity of the apparatus of a given size by speeding up the reactions involved in the reduction of the metal oxide. However, mechanical problems involved in charging ore to the reduction zone under pressure and removing the reduced metal therefrom tend to offset to some extent the advantages of operating under pressure. In the kiln type ore reduction processes, it is also desirable in some instances to introduce additional air to the kiln during the reduction operation to burn a portion of the reducing gas in order to maintain the desired high temperatures in the kiln necessary for rapid reaction between the reducing gas and ore.

Hydrogen, carbon monoxide, and mixtures of carbon monoxide and hydrogen may be used as reducing gases in various ore reduction processes. Processes for the generation of mixtures of carbon monoxide and hydrogen, or synthesis gas as it is commonly called, are already known. In some more recently developed processes, carbon monoxide and hydrogen mixtures are generated by noncatalytic direct partial oxidation of a carbonaceous fuel with an oxygen-containing gas. The resulting gas containing carbon monoxide and hydrogen is not generally suitable for use directly as reducing gas. The composition of the synthesis gas stream depends upon the fuel employed, the quality of the oxidizing gas (e.g. oxygen purity), the relative proportions of fuel and oxidizing gas, and the gasification reaction conditions. Generally it is necessary to purify the gas stream and to adjust its composition before it is suitable for the direct reduction of ores, such as iron ore. In order to purify the gas stream, it is generally necessary to reduce the temperature of the gas stream from the elevated temperature at which it is produced, e.g. above 2,000° F., to substantially atmospheric temperature or below. The gas must then be reheated to the temperature required for the ore reduction, e.g. about 1,000° F. to 2,000° F. This may be accomplished by passing the reducing gas through a furnace.

In the process of this invention, reducing gas is generated from heavy hydrocarbons in a two-step process employing air as the oxidizing gas. Partial oxidation of the hydrocarbon is limited to produce a raw gas containing free carbon and methane. Carbon and water are removed from the gas stream and the gas is heated to the required elevated temperature necessary for the ore reduction by direct partial oxidation of the carbon-free gas.

In the process of this invention, reducing gas generation is carried out in two flow-type gas generators operated in tandem. The flow-type synthesis gas generation process is characterized by the substantially adiabatic direct partial oxidation of fuel with oxygen-containing gas in an unpacked reaction zone with the fuel dispersed in the oxidizing gas. This reaction system is adaptable to the production of carbon monoxide and hydrogen from gaseous, liquid, and solid fuels. In the present process, flow-type synthesis gas generation is employed in the first gasification reactor for the production of crude reducing gas by partial oxidation of heavy liquid hydrocarbon with air. A preferred method of operating is disclosed in U.S. Patent 2,809,104 to Dale M. Strasser, Frank E. Guptill and Charles P. Marion.

In the production of the crude reducing gas by partial oxidation of heavy oil with air some free carbon, generally from about 2 to about 5 percent of the carbon content of the feed hydrocarbon, preferably about 3 percent, is produced. The crude reducing gas also contains from about 3 to about 6 percent methane. In some ore reduction processes, carbon is undesirable in the reducing gas. In the present process, raw synthesis gas from the first gas generator is scrubbed with water, effecting removal of carbon and water of reaction from the crude gas stream. The scrubbed gas is then fed to a second reactor wherein it is partially oxidized with air under substantially adiabatic reaction conditions, heating the gas stream to a temperature of the order of 1800° F. or higher and producing a hot reducing gas suitable for direct reduction of iron ore.

While the present invention is particularly suited to and is described with particular reference to the reduction of iron oxides, it is contemplated that it may be used for the reduction of other metal oxides amenable to reduction with hydrogen, including oxides of copper, nickel, chromium and manganese.

Although the process of this invention may be applied to various types of ore reduction systems, it is especially useful in the reduction of ore in a rotary kiln type process, particularly in the reduction of pelleted particle form ore in a kiln in which reducing gas flows generally countercurrent to the direction of mass movement of the ore undergoing reduction. The process of this invention is readily adaptable to production of reducing gas at any desired pressure ranging from atmospheric pressure to pressures of several hundred pounds per square inch.

It has previously been proposed to reduce metal ore with reducing gas prepared by direct partial oxidation of carbonaceous fuels with oxygen. In these processes, partially spent reducing gas, after the removal of water, carbon dioxide, or both, is recirculated to the ore reduction furnace. While such processes operate satisfactorily, they possess disadvantages in that an oxygen plant is required which involves a high investment cost, and considerable operating experience is involved in recompressing processing and recirculating the partially spent reducing gas.

In the present process, the reducing gas is produced by directly oxidizing the heavy liquid hydrocarbon with air, scrubbing the gas with water, effecting removal of carbon therefrom, partially oxidizing the resultant clean raw synthesis gas stream, effecting reheat to an elevated temperature of the order of 1800° F. or higher, and passing the resulting gas directly to the reduction zone, preferably as the sole source of reducing gas.

Air to the reactors or gas generators is preferably supplied at a temperature of 500° F. or higher, advantageously, at a temperature in the range of 1000 to 2000° F. Oil and steam are supplied to the first reactor at a temperature of at least 500° F., suitably 700 to 900° F., with the oil dispersed in steam. Gas from the first reactor, following removal of carbon and water, is preheated to a temperature of 500° F. or higher, preferably 800 to 1500° F. Air to the second generator is preferably heated to a temperature of 1000° F. or more, suitably 1500 to 1800° F.

In the present process, the reducing gas is suitable for passing to the reactor on a "once-through" basis, that is, there is no recycle of gas from the ore reduction zone. This is economically practical with the present process in which air is used directly as a source of free oxygen for the partial oxidation reaction. The process eliminates the need for air fractionation, for shift converters, driers, recycle compressors, carbon dioxide removal apparatus, and the like, characterizing ore reduction processes which employ hydrogen, carbon monoxide, or high purity mixtures thereof for direct reduction. In addition, the present process is applicable to the reduction of sulfides, ores and mixed oxides and sulfides, as readily as to the reduction of relatively pure oxides.

The following example illustrates the application of the process to the production of reducing gas for utilization in a kiln-type ore reduction system.

EXAMPLE

Bahia crude residuum of 29.3 API gravity, having a gross heating value of 19,620 B.t.u per pound is reacted with steam and oxygen in a 60 cubic foot flow-type synthesis gas generator to produce a reducing gas for direct reduction of ore in a kiln-type ore reduction process. The oil has the following ultimate analysis, expressed in weight percent:

*Fuel Oil Analysis*

| | |
|---|---|
| Carbon | 86.0 |
| Hydrogen | 13.9 |
| Nitrogen | 0.02 |
| Sulfur | 0.06 |
| Oxygen | 0.02 |

This oil, at the rate of 5,750 pounds per hour, is dispersed in 1,438 pounds per hour of steam and the resulting dispersion supplied to a flow-type synthesis gas generator at 800° F. into admixture with 273,400 standard cubic feet per hour of air preheated to 1500° F. The reaction is carried out at 75 p.s.i.g. and at an autogenously maintained temperature of about 2200° F. Crude reducing gas containing free carbon is produced at the rate of about 504,120 standard cubic feet per hour having the following analysis, expressed in mol percent.

*Crude Reducing Gas*

| | |
|---|---|
| Carbon monoxide | 24.9 |
| Hydrogen | 25.0 |
| Carbon dioxide | 0.9 |
| Water | 2.2 |
| Nitrogen and argon | 42.7 |
| Methane | 4.3 |

Approximately 3 percent of the total carbon contained in the hydrocarbon oil feed is liberated as free carbon in the raw synthesis gas. The product gas is cooled from 2200° F. to 500° F. in a waste heat boiler generating stem at 450 p.s.i.g. after which the gas is scrubbed with water at a temperature of about 100° F. Carbon and most of the water vapor produced in the reactor is removed from the gas stream forming an intermediate gas having the following analysis, expressed in mol percent:

*Intermediate Gas*

| | |
|---|---|
| Carbon monoxide | 25.4 |
| Hydrogen | 25.6 |
| Carbon dioxide | 0.9 |
| Nitrogen and argon | 43.7 |
| Methane | 4.4 |

The intermediate gas is preheated to 1,000° F. in a furnace and passed at the rate of 494,000 standard cubic feet per hour to a 33 cubic foot synthesis gas generator wherein it is admixed with air preheated to 1500° F. and supplied to the gas generator at the rate of 162,800 standard cubic feet per hour. The reaction is carried out at 5 p.s.i.g. at an autogenously maintained temperature of about 2200° F. Reducing gas is produced at the rate of 655,000 standard cubic feet per hour having the following analysis, expressed in mol percent:

*Reducing Gas Analysis*

| | |
|---|---|
| Carbon monoxide | 19.7 |
| Hydrogen | 18.2 |
| Carbon dioxide | 2.6 |
| Water | 6.0 |
| Nitrogen and argon | 52.6 |
| Methane | 0.9 |

This reducing gas is free from carbon and is suitable for charging directly to a kiln-type or reduction zone.

Obviously, many modifications and variations of the invention, as hereinbefore set forth, may be made without departing from the spirit and scope thereof, and therefore only such limitations should be imposed as are indicated in the appended claims.

We claim:
1. A method for the production of reducing gas suited for the direct reduction of solid metal oxides and sulfides which comprises subjecting a heavy hydrocarbon liquid to partial oxidation with air under synthesis gas generation conditions at a temperature in the range of 1800 to

2400° F. effecting production of a crude reducing gas comprising carbon monoxide and hydrogen and containing methane and free carbon; substantially completely removing carbon and water of reaction from said crude reducing gas to produce an intermediate gas comprising carbon monoxide and hydrogen substantially free from carbon and water and containing methane; heating said intermediate gas to an elevated temperature of at least 500° F.; separately heating air to an elevated temperature of at least 1000° F.; combining said preheated air and intermediate gas streams and subjecting the resulting mixture to a non-catalytic partial oxidation reaction under substantially adiabatic reaction conditions with relative proportions of air and gas such that an autogenous temperature in the range of 1800 to 2400° F. is maintained producing hot reducing gas; and discharging hot reducing gas from said reaction zone at said reaction temperature to an ore reduction zone.

2. A process according to claim 1 wherein said air is heated to a temperature in the range of 1500 to 1800° F. and said gas is heated to a temperature in the range of 1000 to 1500° F. prior to admixture with one another in said reaction zone.

3. A process according to claim 1 wherein said crude reducing gas contains carbon in an amount within the range of from about 2 to about 5 percent of the carbon contained in said hydrocarbon liquid.

4. A process according to claim 1 wherein carbon and water are removed from said crude reducing gas by scrubbing said crude reducing gas with water at a temperature of about 100° F.

5. A process for the production of reducing gas suited for the direct reduction of solid metal oxides and sulfides from heavy hydrocarbon liquid which comprises heating a stream of air to a temperature of at least 500° F.; separately heating a dispersion of steam and heavy hydrocarbon liquid to a temperature of at least 500° F.; combining said preheated air and said oil-steam dispersion and subjecting resulting mixture to non-catalytic reaction in a reaction zone with relative proportions of hydrocarbon, steam and air effective to maintain a temperature in the range of 1800 to 2400° F. in said reaction zone under substantially adiabatic reaction conditions, producing a crude reducing gas stream containing carbon monoxide, hydrogen, nitrogen, and uncombined carbon; cooling said crude reducing gas stream and scrubbing with water at a temperature of about 100° F. effecting removal of uncombined carbon and water of reaction to yield an intermediate gas stream; heating said intermediate gas stream to a temperature of at least 1000° F.; separately heating air to a temperature of at least 1500° F.; combining said preheated air and intermediate gas streams and subjecting the resulting mixture to non-catalytic partial oxidation reaction under substantially adiabatic conditions with relative proportions of said gas and air such that an autogenous temperature of 1800 to 2400° F. is maintained in said reaction zone; and discharging a stream of reducing gas from said second reaction zone at said temperature directly to an ore reduction zone.

6. A process according to claim 1 wherein said intermediate reducing gas stream contains a substantial amount of methane produced by said reaction of said heavy hydrocarbon liquid and air in said first reaction zone.

References Cited in the file of this patent
UNITED STATES PATENTS

| | | |
|---|---|---|
| 1,957,743 | Wietzel et al. | May 8, 1934 |
| 2,707,147 | Shapleigh | Apr. 26, 1955 |
| 2,793,938 | Frank | May 28, 1957 |
| 2,809,104 | Strasser et al. | Oct. 8, 1957 |
| 2,821,465 | Garbo | Jan. 28, 1958 |
| 2,942,960 | Gerhold | June 28, 1960 |